United States Patent [19]

Cleary

[11] Patent Number: 5,326,537
[45] Date of Patent: Jul. 5, 1994

[54] COUNTERFLOW CATALYTIC DEVICE

[76] Inventor: James M. Cleary, P.O. Box 541, Falmouth, Mass. 02540

[21] Appl. No.: 11,290

[22] Filed: Jan. 29, 1993

[51] Int. Cl.⁵ ............................................. F01N 3/10
[52] U.S. Cl. ................... 422/173; 422/177; 422/109; 422/113; 422/202; 422/203; 422/204; 431/5; 165/909
[58] Field of Search ............. 422/173, 177, 113, 109, 422/202, 203, 204; 165/909, 66; 431/5

[56] References Cited

U.S. PATENT DOCUMENTS

| | | | |
|---|---|---|---|
| 1,799,039 | 3/1931 | Conejos | 165/119 |
| 2,768,508 | 10/1956 | Guyton | 165/148 |
| 2,861,873 | 11/1958 | Worn | 422/148 |
| 3,466,152 | 3/1966 | Yamamuto | 422/148 |
| 3,854,530 | 12/1974 | Jouet et al. | 165/164 |
| 3,898,040 | 8/1975 | Tabak | 422/171 |
| 4,454,826 | 6/1984 | Benedick | 110/211 |
| 4,531,463 | 7/1985 | Kratz et al. | 110/212 |
| 4,574,872 | 3/1986 | Yano et al. | 165/8 |
| 4,577,683 | 3/1986 | Kelch | 165/164 |
| 4,770,857 | 9/1988 | Ludwig | 422/111 |
| 5,120,502 | 6/1992 | Gordon et al. | 422/113 |
| 5,152,338 | 10/1992 | Dethier et al. | 165/170 |
| 5,152,339 | 10/1992 | Calleson | 165/173 |
| 5,163,829 | 11/1992 | Wildenberg | 431/5 |
| 5,220,955 | 6/1993 | Stokes | 165/909 |

Primary Examiner—Robert J. Warden
Assistant Examiner—Hien Tran
Attorney, Agent, or Firm—Thomas A. Kahrl

[57] ABSTRACT

A catalytic oxidizer having a combined central catalyst chamber and a spiral heat exchanger for treatment of air hydrocarbon vapor mixture including an outer shell of circular cross section having a tangentially directed longitudinal inlet aperture, a parallel exhaust aperture, an end cover plate and having a catalytic chamber centrally and coaxially positioned in the outer shell including an inlet port and an outlet port, the catalytic chamber including an upstream plenum, a catalyst core member and a downstream plenum, having perforated partitions for separating the catalyst core member from the inlet plenum and the exhaust plenum, and a coaxial spiral plate heat exchanger surrounding the catalytic chamber including a spiral inlet passage formed by coiled plates connected at one end to the inlet aperture and at the other end to an outlet associated with the inlet plenum defining a first heat exchange region, the coiled plates being spaced apart to create an intermediate spiral exhaust passage, the heat exchanger being sealed at opposite ends defining a second heat exchange region; and including a by-pass device for detecting and venting excess pressure in the catalyst chamber; wherein inlet flow passes through the spiral inlet passage inwardly and an opposed exhaust flow passes outwardly in the adjacent spiral exhaust passage, the exhaust, being heated by catalytic combustion in the core, heats the inlet flow.

9 Claims, 3 Drawing Sheets

COUNTERFLOW CATALYTIC DEVICE

BACKGROUND OF THE INVENTION

The present invention relates to a portable catalytic oxidizers for use in the destruction of hydrocarbon vapors in order to purify an air stream and prevent pollution. Typically the most common application of such catalytic oxidizers is in the destruction of vapors extracted insitu from soils that have been contaminated with hydrocarbons, typically by a hydrocarbon leak from a storage tank. Such applications normally involve the clean-up of vapors contained in an air stream generated during clean-up of hydrocarbon spills where the contaminated air stream is near ambient temperatures. The hydrocarbon content of the air stream is diluted if necessary to keep it below the lower explosion limit (LEL). In prior art devices directed to such applications, the catalyst employed for catalytic combustion usually employs platinum group metals, typically comprised of finely divided platinum and/or (palladium) deposited on a high surface area alumina substrate, which in turn is deposited on a honeycomb support structure of stainless steel or ceramic. The advantage of a catalytic combustion process is that it can be operated at a much lower temperature and lower hydrocarbon concentration than is possible with ordinary flame combustion. Many applications involve very low concentrations of hydrocarbon where catalytic combustion is efficient, while flame type combustion is not practical.

The catalytic oxidizers used in hydrocarbon spill cleanup, such as the present invention, normally operate with inlet air hydrocarbon vapor mixture concentrations less than 25% of the lower explosive limit (LEL). The air hydrocarbon vapor mixture source may have much higher concentration, frequently in the explosive range. In such cases, the preferred mode of operation is to provide controlled dilution of the source stream with air, so as to maintain the inlet concentration to the catalytic unit within acceptable limits. If the inlet air hydrocarbon vapor mixture concentration exceeds the lower explosive limit (LEL), an ignition might occur within the catalytic unit. Excess pressures resulting from such ignition of high air hydrocarbon vapor mixture concentration have typically been compensated for in prior art catalytic converters by providing a vessel having substantial wall thickness and mass to contain such overpressures. Other prior art devices employ blast vents and doors to relieve excess pressures.

Accordingly, it is an object of the present invention to provide a catalytic oxidizer that is portable, compact and minimizes the overpressure that can develop due to ignition of air hydrocarbon vapor mixture mixtures within it.

Applicant is aware of several forms of prior art catalytic oxidizers, commonly called catalytic incinerators. These incinerators are commonly assembled by piping the basic elements together and enclosing the heated portion including the catalyst in an insulating jacket. Such incinerators are generally of the form including a catalyst chamber, a heater, a heat exchanger of fixed-tube-sheet construction employing a plurality of heat exchanger tubes, thermocouple sensors, piping and automatic controls. One such device is covered by U.S. Pat. No. 3,898,040 to F. Tabak which discloses a compact integrated design for an incinerator that combines a burner with a catalytic operation. While the Tabak incinerator differs markedly in structure, it combines heat recovery and catalytic combustion in a singular shell. Other catalytic fume incinerators are of an integrated design but of different heat exchanger configuration from the applicant's current invention are disclosed in U.S. Pat. No. 2,861,873 to Worn and U.S. Pat. No. 4,770,857 to Ludwig. Further patent to U.S. Pat. No. 3,466,152 to Yamamoto et. al., discloses a synthesizing reactor disclosing a vessel having a substantial weight in thickness employing high pressure synthesis including a plurality of spaced catalyst chambers, each having an in and an outlet, and a heat exchanger is disposed in a separate chamber employing flow tubes and baffles to facilitate heat exchange between unreacted gas and reacted gas.

Contrary to Yamamoto and the other prior art, the current invention has identified a problem hitherto not recognized by the prior art which is that catalytic oxidizers used for the clean-up of hydrocarbon spill operations require portability, with explosion protection adapted to be carried to various sites or remote locations. The current invention has solved this problem by combining an counterflow, spiral-path, heat exchanger coaxially wrapped around a central catalyst core employing an electric heater, a safety relief device for relief of excess pressure and an insulated outer shell into a compact integrated assembly thus minimizing piping, insulation and generally the weight of materials needed to assemble the unit by utilizing the improved heat transfer of the spiral path counter flow heat exchanger configuration.

It is therefore desirable to provide an improved portable and highly efficient, lightweight, compact catalytic oxidizer for the destruction of hydrocarbon vapors and for purification of an air stream and to provide a method of oxidizing hydrocarbon vapors by utilization of a catalytic oxidizer apparatus having a coaxial heat exchanger which is simple to operate, highly efficient, explosion resistant and is portable.

SUMMARY OF THE INVENTION

The present invention is directed to a compact, portable catalytic oxidizer comprising an outer shell, a catalyst chamber in combination with a coaxial, spiral heat exchanger adapted for on-site clean-up of hydrocarbon vapors, and to a method of treating hydrocarbon vapors employing the catalytic oxidizer of the invention.

As provided in the preferred embodiment, the catalytic oxidizer is adapted to provide for flameless combustion of hydrocarbon vapors extracted from contaminated soils. The usual case is soil contamination due to a leaking storage tank, or associated piping. In operation, hydrocarbon contaminated air is introduced into the outer shell via an inlet aperture and carried via a spiral inlet passageway in said heat exchanger forming a passage to the catalyst chamber. It is noted that this configuration of the present invention makes highly efficient use of the space within the outer shell.

Referring to the Figs. the outer shell comprises an outer shell, having a thin-walled cylindrical cover, a top cover plate and a bottom cover plate for enclosing a central volume, said volume containing the catalyst chamber and the spiral heat exchanger constructed from spiral-formed plates. Said heat exchanger surrounds the catalyst chamber and is constructed to fill an annular volume between the outer shell and the catalyst chamber.

In the preferred embodiment, the outer shell is configured as a vessel, is of stainless steel construction, and is covered by a lightweight insulating layer, typically a mineral wool with weather proof outer facing and is of generally circular cross-section. The top and bottom cover plates of the outer shell are of generally disk-shaped construction, and said outer shell is constructed of formed metal, such as 304 stainless steel, typically sheet metal of a thickness of 0.06" (1.5 mm), formed in a generally cylindrical configuration. It should be noted that the cylindrical surface of the cylindrical cover is exposed to exhaust gas after it has passed through the heat exchanger and is at relatively moderate temperature. The required thickness of insulation on the cylindrical surface of the shell is thus minimized. The outer shell also comprises an exhaust flow device including an exhaust stack and a connection member and a air hydrocarbon vapor mixture inlet aperture. Also the top cover plate includes penetrations for at least two thermocouples, an opening for facilitating the installation of a catalyst member, such as a particulate catalyst.

As shown in FIGS. 3 & 4 the catalyst chamber includes a catalyst bed, and is configured as a modified cylinder, formed from two half cylinders located on the central axis of the outer shell. In the preferred embodiment, the catalyst chamber is configured with generally cylindrical sides having an inlet aperture and an oppositely disposed outlet aperture, both apertures extending substantially the entire length of the cylindrical sides. Said catalyst chamber, having a modified circular cross section, is formed from two half cylinders. The axes of the half cylinders are parallel, and the edges of the half cylinders are offset providing two tangentially directed, longitudinally extending apertures positioned on opposite sides of the catalyst chamber, disposed with the edges of the half cylinders occupying a common plane.

As is shown in FIG. 3, the catalyst chamber is divided longitudinally into three zones, a central catalyst core, an inlet plenum, and an exhaust plenum, the division between the three zones being effected by partitions, typically two perforated metal plates. The central catalyst core is constructed to provide a containment for holding a catalyst bed. Said catalyst chamber also includes a baffle positioned within the inlet plenum at the upstream end to form a heater passage. A heater device of conventional construction, is positioned within said heater passage and is electrically connected to an automatic control system. In the preferred embodiment, a particulate catalyst is used to form the catalyst bed. In another embodiment, the catalyst core could be designed to hold a monolithic honeycomb type catalyst and still fall within the scope of the invention. Also, in the preferred embodiment, an electric heater is used however, in another embodiment, a gas burner could be used within the scope of the invention.

The spiral heat exchanger is of annular construction configured to surround the catalyst chamber in coaxial relation therewith. Said heat exchanger comprises two uniformly spaced spiral plates. The spaces between the spiral plates form two meshed spiral passages, an inlet passage and an exhaust passage. The width of passages is set by winding the plates on a plurality of spacers extending the length of the plates. The spiral plates form continuous heat exchange surfaces between the two spiral passages. The flows in the two passages run counter to one another. The inlet passage carries air hydrocarbon mixture inwardly from the inlet header to the inlet plenum of the catalyst chamber. The exhaust passage carries air and combustion products from the exhaust plenum of the catalyst chamber outwardly to the exhaust header, thence to be vented from a stack. The curved edges of the spiral plates are joined by spiral strips so that the spiral plates together with the spiral strips take the form of a flat coiled tube enclosing the inlet passage. The exhaust passage then follows the space between the coils of the tube.

The heat exchanger is adapted to provide for two opposed flow paths, the first flow path directed inwardly toward the catalyst chamber through the inlet passage, the second flow path being directed outwardly and away from the catalyst chamber through the exhaust passage, wherein the incoming air hydrocarbon vapor mixture, normally near ambient temperature, passes across the continuous heat exchanger surface of the side walls of the inlet passage formed as a continuous flat tube. The air hydrocarbon vapor mixture, having passed inwardly through the inlet passage, then passes into the inlet of the catalyst chamber thence through the inlet plenum through the perforated sheet, thence through the core outwardly across the second perforated sheet into the exhaust plenum. Flameless combustion will have occurred within the catalyst bed filling the core. The heated air passes away from the catalyst chamber into the spiral outlet passage and into the stack.

In this manner, the untreated air hydrocarbon vapor mixture and the treated exhaust gasses flow counter to one another in the two passages of the heat exchanger, wherein said untreated air hydrocarbon vapor mixture, moving inward toward the inlet plenum in one passage, is heated by the spiral plates forming common boundaries between the adjacent passages, while the exhaust gas, moving outward from the exhaust plenum, gives up its heat to the same spiral plates defining the two spiral passages. Thus the spiral inlet passage and inlet plenum form a first heat exchange region on the cooler side of the spiral plates, and the spiral exhaust passage and exhaust plenum form a second heat region on the hot side. The upstream end of the inflow passage is connected to an inlet header mounted in the wall of the enclosing outer shell. The inlet header is connected to the piping supplying hydrocarbon contaminated air, and, the upstream end of the outflow (hot) passage is connected to the outlet portal of the exhaust plenum. The downstream end of the outflow passage follows the interior of enclosing shell, and thence flows into the exhaust header and out a stack.

The automatic control system includes sensors comprising an inlet and an outlet thermocouple connected to a dual action by-pass valve. Said by-pass valve is spring loaded to act as a passive relief valve for relieving excess pressure in the catalytic oxidizer and includes a solenoid actuator connected electrically to said sensors to change the position of the valve for controlling temperature in the catalyst chamber in response to signals from the thermocouple in the outlet plenum. Said automatic control system is adapted to provide explosion-inhibiting operation having a bypass exhaust connector connected to the solenoid actuated valve for controlling flow through a bypass passage, to control over temperature by action of the solenoid device and configured to relieve excess pressure in the catalyst chamber by operation of the spring acting against the valve.

The catalytic oxidizer further includes a flow-mixing apparatus provided in the inlet passage and outlet passage comprising a series of helixes inserted in the heat exchanger in first heat exchanger regions and second heat exchanger regions. In particular, the flow mixing apparatus comprises a plurality of helical strip spacers, establishing the width of the inlet flow passage and exhaust flow passage. These strips provide an important contribution to the mechanical stability of the heat exchanger, and have a mixing action on the flow through the passages to improve heat exchange efficiency.

The operation of the catalytic oxidizer is summarized as follows: The hydrocarbon air mixture introduced into the vessel via an input header. The vapors are preheated as they travel inward through the spiral inlet passage of the spiral heat exchanger. The preheated vapors enter the inlet plenum of the catalyst chamber. At this point, the temperature of the air hydrocarbon vapor mixture may be increased further to a selected preheat temperature by a heater, for example to 330° C. The automatic control system controls a plurality of heater elements in response to signals from the thermocouple in the inlet plenum to set the temperature within proper limits before the air hydrocarbon vapor mixture enters the catalyst bed. The air hydrocarbon vapor mixture then flows from the inlet plenum into the catalyst bed, which fills the catalyst core. The hydrocarbon vapor is oxidized to carbon dioxide and water in the catalyst filled core. The oxidation of hydrocarbons in the catalyst bed increases the temperature of exhaust gas to a still higher temperature. The gas flows from the catalyst into the exhaust plenum, and back into the exhaust (hot side) passage of the heat exchanger.

In the preferred embodiment, the by-pass apparatus comprises a by-pass tube device permeates the top cover plates of the outer shell and the top closure plate of exhaust plenum. The by-pass apparatus connects the exhaust plenum directly, to the exhaust stack.

An inlet temperature sensor comprising a thermocouple is provided near the inlet end of the catalyst chamber. During operation of the apparatus, an automatic controller device adjusts the output of the heater in response to a temperature signal from this first temperature sensor. An exhaust temperature sensor, typically a thermocouple, monitors the gas temperature in the exhaust plenum. If the temperature of the gas is above a selected temperature, for example 550° C., the control system, responds to the exhaust sensor by changing the position of a solenoid valve. The solenoid valve diverts a portion of the flow from the exhaust plenum directly to the exhaust stack. This diverting action reduces the heat recovered in the heat exchanger, lowering the temperature of the air hydrocarbon vapor mixture entering the inlet plenum. The solenoid valve is spring loaded in its normally closed position. Excess pressure in the exhaust plenum will act to open the valve member allowing gases to vent freely from the catalyst chamber to the stack in the event of such excess pressure.

The catalytic oxidizers used in hydrocarbon spill cleanup such as the present invention normally operate with inlet vapor concentrations less than 25% of the lower explosive limit. The present invention is used with shut off controls set to automatically shut down the system if the inlet vapor concentration exceeds a limit, which will generally be less than 25% LEL such that the chance of excess pressure in the catalytic oxidizer due to ignition within contained vapor mixtures is minimized. There is, however, a possibility that explosive vapor concentrations might enter accidentally due to equipment malfunction, or operation error. On such occasion, ignition might occur within the unit. Excess pressures resulting from such ignition of high air hydrocarbon vapor mixture concentration should be kept as small as possibly to minimize the chance of explosion damage or injury to personnel.

The excess pressure resulting in ignition and flame propagation is determined by the flame propagation rate, the volume through which the flame can propagate, the degree to which expanding gases in this region can vent to the atmosphere, and the heat transfer rate to the enclosing structure. The inlet plenum and exhaust plenum constitute the only significant open volumes through which a flame front might propagate rapidly to create an overpressure. The compact interconnectedness of the present invention tends to minimize to excess pressure resulting from ignition of explosive vapors specific features helping to limit excess pressures are as follows:

1. The substantially two dimensional flow permits relatively small inlet and exhaust plenum volumes, while maintaining substantially uniform pressure on the inlet and outlet faces of the catalyst bed. The volume through which a flame front can propagate to cause rapid gas displacement is thus limited.

2. The inlet plenum and the exhaust plenum are broadly and conductively connected to catalyst core, consequently, a flame front enters the catalyst core, after a short propagation distance where it becomes quenched by high heat transfer rate to a lower temperature, reversing the rapid expansion effect.

3. Expanding gas from the inlet plenum can vent with moderate flow resistance through the catalyst bed into the exhaust plenum which vents through a stack, the stack being highly conductive and substantially at atmospheric pressure.

4. The exhaust plenum is closely connected to the stack through a bypass tube and bypass solenoid valve which is spring loaded to resist the normal operating pressure, normally less than 6" water head. The bypass solenoid may for example, be set to open at 12" of head, providing a conductive escape path from the exhaust plenum to the stack. The bypass tube and the bypass solenoid valve may easily be made as conductive as required for safe venting.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DETAILED DESCRIPTION OF THE PREFERRED EMBODIMENT

Figure 1:
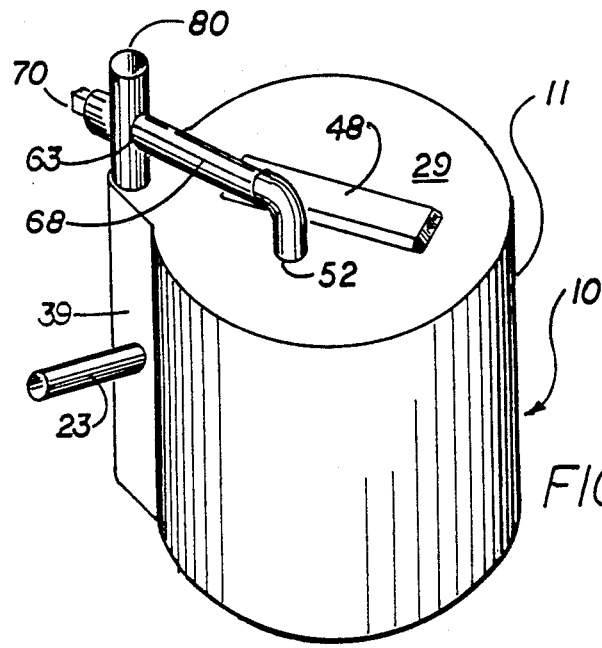
FIG. 1 is a perspective view from above of a counterflow catalytic device of the invention.

Referring to the drawings, there is shown a catalytic oxidizer 10 comprising an outer shell 11 containing a centrally positioned catalyst chamber 12 surrounded by an annular, counterflow heat exchanger 14.

Figure 3:
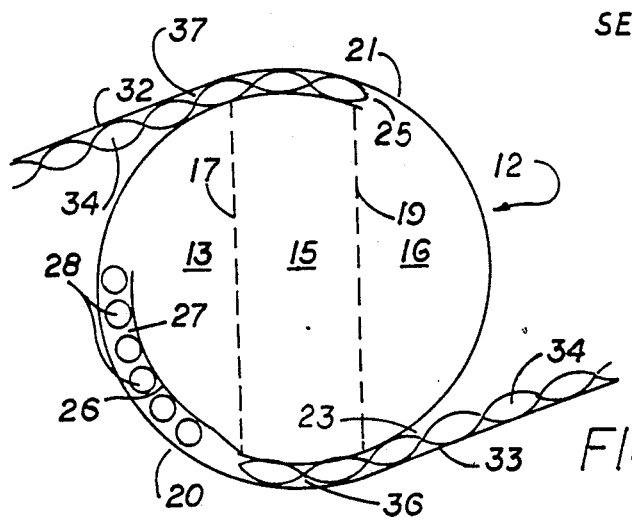
FIG. 3 shows the catalyst chamber of the counterflow catalytic device of in FIG. 1, in an top cross-sectional exploded view.
Figure 5:
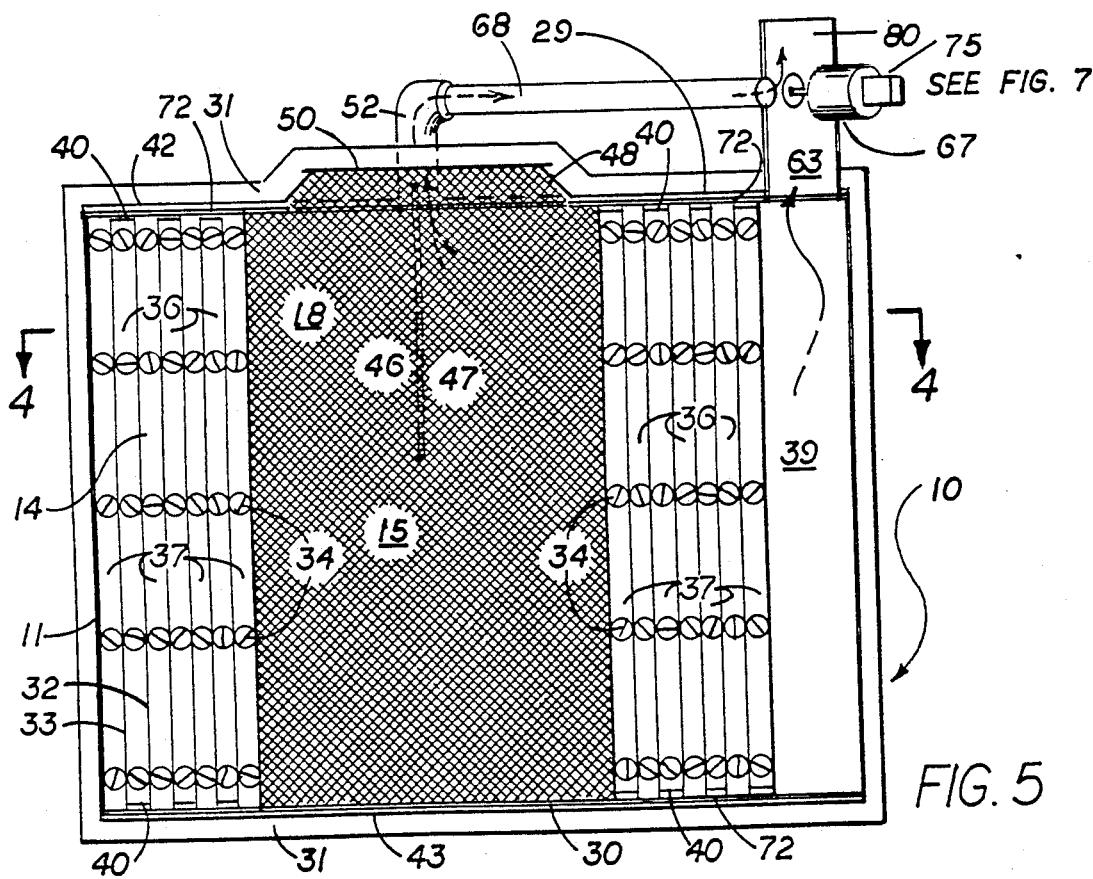
FIG. 5 is a side cross sectional view of the counterflow catalytic device according to the invention of FIG. 1 taken along lines 5—5 of FIG. 4 showing helical spacers positioned in a spiral inlet passage and in a spiral exhaust passage.

As is seen in FIG. 3, the catalyst chamber 12 is divided into three zones, comprising an inlet plenum 13, a central catalyst core 15 and an exhaust plenum 16, the zones being divided by a first perforated plate 17 on the upstream face of said catalyst core, and a second perforated plate 19 on the downstream face of catalyst core 15, said catalyst core configured as a container for a catalyst bed 18 shown in FIG. 5. In this embodiment, the catalyst chamber 12 is comprised of two half-cylinders, a first half cylinder 20, and a second half-cylinder 21, wherein said cylinders are offset resulting in two parallel side openings, the first opening comprising an inlet aperture 23 providing an inlet to said inlet plenum 13, the second side opening comprising an exhaust or outlet aperture 25 comprising an outlet from exhaust plenum 16. The relationship between said half-cylinders is further defined as follows; the axis and longitudinal edges of half-cylinders 20 and 21 occupy a common plane. One cylinder is displaced along this plane perpendicular to said axis over a distance less than 5% of the diameter of the catalyst chamber 12.

Figure 4:
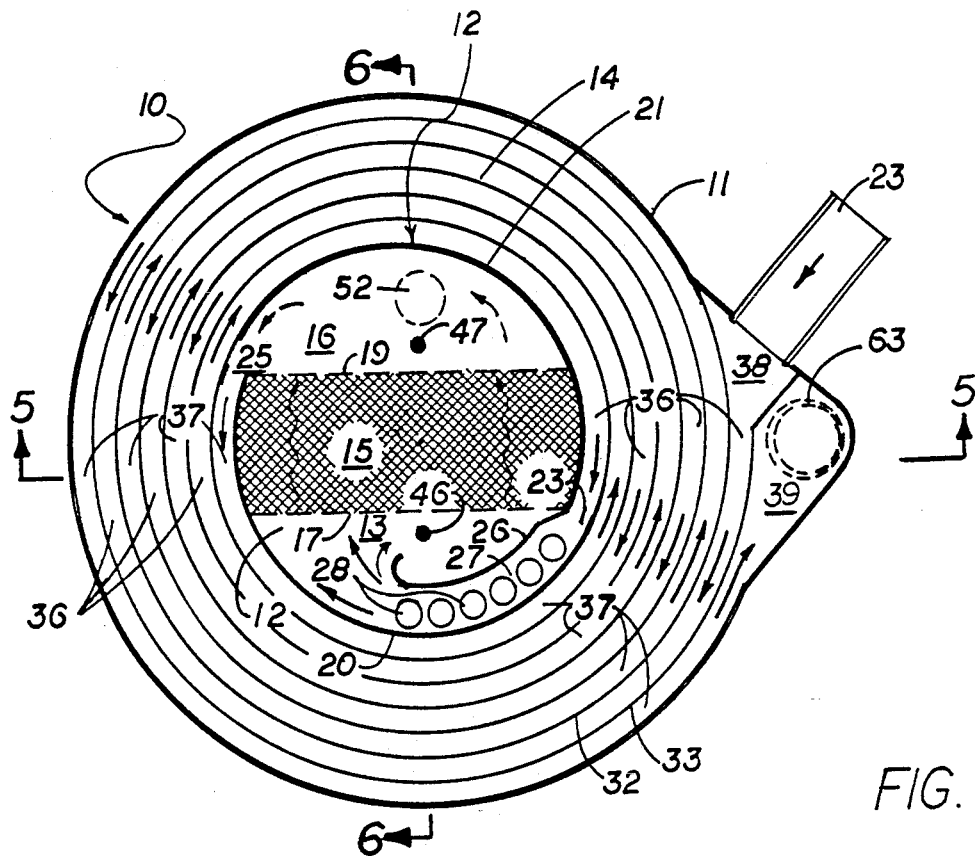
FIG. 4 is a cross-sectional view of the counterflow catalytic device of FIG. 1 taken along lines 4—4 of FIG. 5 showing the flow patterns in the heat exchanger, with the catalyst chamber in the unfilled condition.
Figure 6:
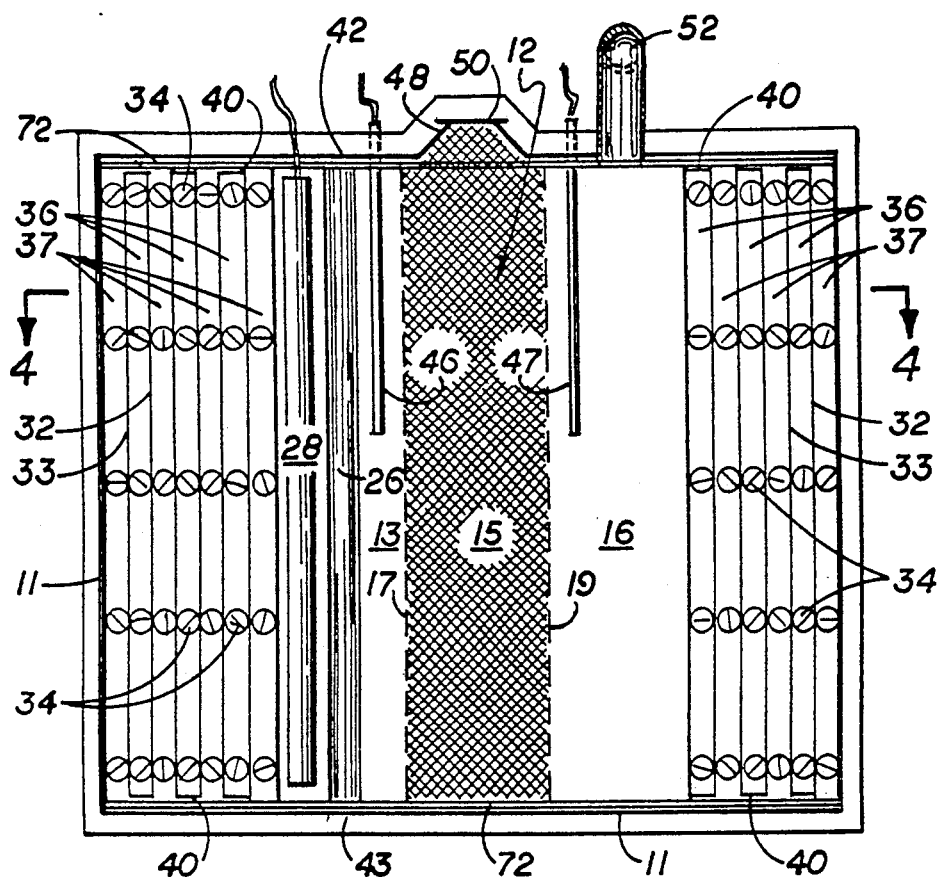
FIG. 6 is a side cross sectional view of the counterflow catalytic device according to the invention of FIG. 1 taken along lines 6—6 of FIG. 4 showing temperature sensors positioned in the catalyst chamber.

As displayed in FIG. 4, depicting a transverse section through the catalytic oxidizer 10, catalyst chamber 12 is shown on the central axis of said catalytic oxidizer. A baffle 26, positioned in the inlet plenum 13, defines a heater passage 27. Said passage contains a heater 28 having a plurality of heater elements. As shown in FIG. 6, an axial vertical cross section through the catalytic oxidizer 10, shows a top closure plate 42, and a bottom closure plate 43 for enclosing chamber 12.

Figure 7:
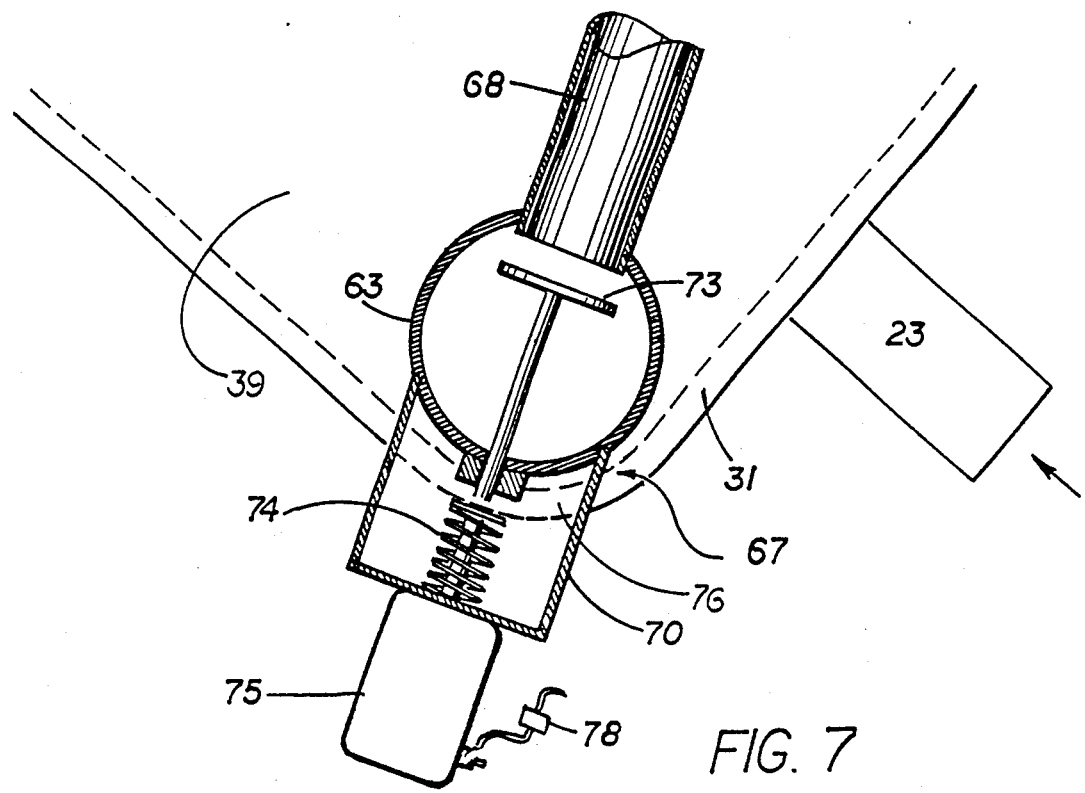
FIG. 7 is a cross-sectional elevation view of the bypass control apparatus of the invention of FIG. 1.

As shown in FIGS. 4 & 7, the annular heat exchanger 14, surrounds catalyst chamber 12. Said heat exchanger includes a first spiral or side wall 32 and a second spiral wall 33, said or side walls being uniformly spaced and coiled in a double spiral around the catalyst chamber 12 to form inlet flow passage 36 and exhaust flow passage 37. The spacing between first formed side wall 32 and second side wall 33 is established by winding said first spiral wall and said second spiral wall on helical spacers 34 shown in FIGS. 3, 5, and 7. The exhaust passage 37 is joined to outlet aperture 25 of exhaust plenum 16, and provides an outflow passage from the catalyst chamber 12. Inlet passage 36 is joined to inlet aperture 23 of inlet plenum 13, said passage is adapted to carry inlet flow in the opposite inward direction from the outwardly flowing exhaust from the exhaust plenum 16. The inlet end of passage 36, opens up into an inlet header 38 which includes a tubular connection to the air hydrocarbon vapor mixture source. Side wall 32 is formed of a continuous coiled metal strip, whose width equals the axial length of chamber 12. Side wall 32 is fastened adjacent to outlet aperture 25, to the outwardly displaced edge of the half-cylinder 21. Similarly, side wall 33 is fastened adjacent to inlet aperture 23 along the outwardly displaced edge of half-cylinder 20.

As shown in FIG. 4, the heat exchanger 14 includes the first side wall 32 spaced from the second side wall 33, coiled in a double spiral around the catalyst chamber 12. The spiral wound side walls 32 and 33 are shown in cross-section showing spaces between the side walls forming the two spiral flow passages comprising inlet flow passage 36 and exhaust flow passage 37. The outer ends of said side walls 32 and 33 terminate in an enclosed inlet header 38. The spiral inlet passage 36 provides a flow path inwardly to the inlet plenum 13. The spiral outlet passage 37 provides a flow path for exhaust flow from the exhaust plenum in the opposite direction to exhaust header 39. Outer shell 11 forms the outer wall of exhaust flow passage 37 along its outer most portions before it joins exhaust header 39.

As is shown in FIGS. 3, 5, and 6, a plurality of helical spacers 34 are positioned in the inlet flow passages 36 and exhaust flow 37 in spaced relation along the axial length thereof configured as helical strips to have a mixing action on the flow, thus increasing heat transfer efficiency while adding only moderately to pressure drop. For clarity, helical spacers 34 are not shown in FIG. 4. As disclosed in FIG. 5, helical spacers 34 establish a uniform spacing between side walls 32 and 33. Also, the gap between the upper and lower edges of side walls 32 and 33 is closed by welding a spiral or welding strip 40 into said gap thus sealing the upper lower boundaries of inlet passage 36. In this way, inlet flow passage 36 is configured in the form of a coiled flat tube. The innermost half coil of passages 36 is sealed by welding strip 40 into the gaps between side wall 33 and the upper and lower edges of half cylinder 21 adjacent to exhaust plenum 16.

Figure 2:
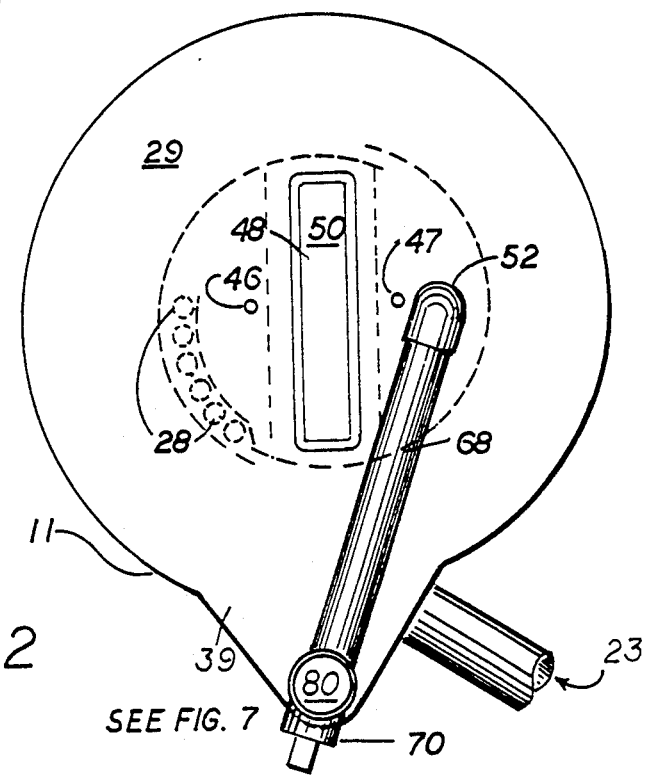
FIG. 2 is a top view of the counterflow catalytic device of the invention as employed in FIG. 1.

Top cover plate 29 shown in FIG. 2, of catalyst chamber 12 positioned at the opposite end of said chamber from bottom cover plate 30 is adapted for mounting heater elements 28, thermocouple devices 46 and 47, catalyst fill header 48, including a flange cover 50, bypass solenoid 70 outlet and a bypass 52, in cooperation with closure plate of catalyst chamber 12. The heater elements 28 serve to heat the flow entering the inlet aperture 23. Said thermocouples comprise the inlet thermocouple 46 which measures the temperature of flow entering the catalyst core and the outlet thermocouple 47 for measuring the temperature of the flow exiting the catalyst core 15. A bypass outlet 52 carries a variable portion of the flow exiting the catalyst core 15 to an exhaust stack 80 to reduce the amount of heat recovered by the heat exchanger 13. A catalyst fill header 48 extends above the catalyst core 15 so that said catalyst filler adapted for receiving particulate catalyst, used in the preferred embodiment, can extend above the top of the catalyst chamber 12. Filling particulate in said header provides a reserve volume of catalyst in case of settlement. FIG. 5 shows a particulate catalyst filling core 15 to form a catalyst bed 18. The outer shell 11 encloses the outermost portion of the spiral exhaust passage 37, wherein an enlargement of the outer shell 11, adjacent to the tube inlet header 38 forms an exhaust header 39. The insulation cover 30 enclosed the outer shell 11.

For the purposes of clarity, multiple arrows are shown in FIG. 4 to show the directions of flow throughout the catalytic oxidizer. This flow is substantially two dimensional. Minimal convergence and divergence of flow through the system favors efficient heat transfer, and the efficient utilization of the catalyst and minimizes the volume required for inlet plenum 13 and exhaust plenum 16 to maintain uniform flow through the catalyst. In the preferred embodiment as shown in FIG. 6, the top closure plate is provided with penetrations for heater elements 28, the inlet thermocouple 46 and outlet thermocouple 47, the catalyst fill header 48 and bypass outlet 52.

As shown in FIGS. 7 and 5 exhaust header 39 tubular extension upward forming stack 63 an automatic control device 67 including a bypass flow passage comprising bypass outlet 52 and bypass tube 68 and a dual action valve device 73 connecting the exhaust plenum 16 to the stack 80. Said valve device includes a spring 74 normally acting against shoulder 76 to close said valve until over pressure in the by-pass tube 68 overcomes the spring 74 and opens said valve and also includes a solenoid device 75 connected to a conventional control device 78 such as a electronic control processor and to the thermocouples 46 and 47 which moves said valve between a closed position and an open position to reduce heater cover; thus controlling temperature in the catalytic oxidizer.

As shown in FIG. 6, a heat resistant gasket 72 is sandwiched between bottom closure plate 43 and the lower edges of first side wall 32 and second side wall 33. Since passage 36 is already sealed by welded spiral strip 40, the primary purpose of gaskets 72 is to prevent radial flow from one coil of passage 36 to the outward coil of passage 37.

The invention further comprises a method of treating hydrocarbon cleanup vapors including the steps of: a) providing the catalytic apparatus of claim 1, b) inputting air hydrocarbon vapor mixture for catalytic treatment via the inlet and the spiral inlet passage, connected to the inlet plenum defining a first heat exchange region in the heat exchanger; c) heating the air hydrocarbon vapor mixture in the first heat exchange region; d) passing the air hydrocarbon vapor mixture through the catalyst chamber via the upstream plenum, the catalyst chamber and the exhaust plenum, via the perforation means; e) incinerating the hydrocarbon vapors by flameless combustion as said vapors pass through the catalyst core; and f) outputting the gas via counter outlet flow of hot treated gas through the spiral outlet passage adjacent and the inlet passage for heating the inlet air hydrocarbon vapor mixture in a second heat exchange region, and releasing the output flow to the atmosphere via the stack apparatus.

What is claimed is:

1. A compact catalytic oxidizer having a transverse, two dimensional flow path for treatment of vapor mixture comprising:
  a) shell means for enclosing a central volume of generally circular cross-section having a longitudinal axis and a wall of generally cylindrical configuration, including an inlet header and an exhaust header;
  b) a combined catalyst chamber and spiral heat exchanger integrally connected and coaxially positioned within the shell means, also of cylindrical configuration, for providing a continuous transverse flow path from the inlet header to the exhaust header having a longitudinal and transverse dimension for two dimensional flow of vapor comprising:
    i) spiral heat exchanger means for providing counter-flow heating of vapor comprising a pair of spaced spiral plates forming therebetween a first spiral flow passage having an external end and an internal end defining a transverse inlet spiral flow path and a second spiral flow passage having an internal end and an external end defining a transverse exhaust spiral flow path; and
    ii) a catalyst chamber centrally positioned along the longitudinal axis of the shell means having permeable partition means for dividing the catalyst chamber into three zones comprising an inlet zone comprising an inlet plenum having an inlet aperture, a central core zone for containing a catalyst means, and an exhaust zone comprising an exhaust plenum having an exhaust aperture; wherein the inlet spiral flow path of the heat exchanger is connected to the inlet plenum defining a first heat exchange region, and the transverse spiral exhaust flow path is connected to the exhaust plenum and is positioned adjacent to the inlet spiral flow path defining a second heat exchange region and said inlet aperture and exhaust aperture are positioned on opposite sides of the catalyst chamber for providing transverse two dimensional flow of hydrocarbon vapor previously heated in the spiral heat exchanger with flameless combustion of the vapor introduced therein and;
  c) control means for controlling the flameless combustion reaction and preventing explosive combustion comprising means for controlling temperature of the catalytic oxidizer comprising sensing means for sensing the temperature in the catalyst chamber; bypass means associated with the sensing means for automatically connecting the exhaust plenum with a relief means to moderate the temperature of the catalyst chamber; heater means connected to the sensing means for controlling the temperature of the vapor mixture entering the catalyst chamber; and pressure relief means connected to the bypass means for relieving over pressure in the catalytic oxidizer configured to move between a closed position to an open relieving position, in response to excess pressure.

2. The catalytic oxidizer of claim 1 having a flow path such that inlet flow of air containing hydrocarbon vapor passes sequentially inwardly, via a flow path transverse to the longitudinal axis of the shell means through the inlet spiral flow path thence directly through the heater means into the inlet plenum, thence transversely through the catalyst chamber for flameless combustion of said vapor, thence into the exhaust plenum and thence outwardly in the adjacent exhaust spiral flow path.

3. The catalytic oxidizer of claim 1 wherein the catalyst chamber is configured with a circular cross section, formed with two half cylinders where axes of said half cylinders are parallel and said axes and edges thereof occupy a common plane wherein the axes are offset for forming the inlet aperture and the exhaust aperture extending longitudinally along the sides of the half cylinders and positioned on opposite sides of said catalyst chamber for providing tangentially directed flow.

4. The catalytic oxidizer of claim 1 wherein the shell means comprises a top, a bottom, a top cover plate of circular disc shape enclosing the top of the shell means and a bottom cover plate in parallel relation thereto and also having a circular disc shape, thereby enclosing the bottom of the shell means and wherein the catalyst chamber comprises a cylindrical shell having a mutually parallel top closure plate and a bottom closure plate, each in parallel relation with the top and bottom cover plate of the shell means and configured with generally cylindrical sides.

5. The catalytic oxidizer of claim 4 wherein the inlet header extends longitudinally along the shell for admitting a two dimensional flow of vapor; and the exhaust aperture extends longitudinally along the shell means for exhausting a two dimensional flow of vapor wherein the top cover plate has a plurality of apertures including a thermocouple aperture and a catalyst access aperture and also includes a bypass exhaust connection having a solenoid actuated valve means.

6. The catalytic oxidizer of claim 1 wherein the heat exchanger provides for two opposed spiral flow paths, the first spiral flow passage directed transversely and inwardly toward the catalyst chamber and the second spiral flow passage directed away from the centrally disposed catalyst chamber, wherein the spiral heat exchanger comprises a spiral flat tube being constructed and arranged to provide for said two opposed spiral flow paths.

7. The catalytic oxidizer of claim 1 wherein the shell means is configured of sheet metal construction covered by insulating materials, and includes an inlet port positioned on the inlet header and an exhaust port positioned on the exhaust header.

8. The catalytic oxidizer of claim 1 wherein the temperature sensor is placed adjacent to the inlet zone of the catalyst, and wherein, in the operation of said apparatus, an automatic controller adjusts an output of the heater means in response to a temperature signal from the temperature sensor.

9. A catalytic oxidizer system for providing automatic relief of explosive air hydrocarbon vapor mixture in the treatment of hydrocarbon gas comprising:
a) an outer shell having a longitudinal axis and a central volume and comprising an inlet header extending longitudinally parallel to the axis of the outer shell, an exhaust header positioned adjacent to and parallel to the inlet header and an end cover means for enclosing the central volume;
b) a combined catalyst chamber and spiral heat exchanger integrally connected and coaxially positioned within the outer shell extending along said longitudinal axis for providing an continuous transverse flow path having a two dimensional flow path comprising:
  i) an coaxial catalyst chamber having a first half cylinder portion offset from a second half cylinder portion, the offset defining an inlet aperture and an exhaust aperture, defining a central volume configured to provide a limited volume to control overpressure, said catalyst chamber comprising an inlet plenum, a catalyst core and an exhaust plenum, and including perforated means for separating the catalyst core from the inlet plenum and the exhaust plenum, and including a top closure plate and a bottom closure plate;
  ii) a coaxial heat exchanger surrounding the catalyst chamber comprising a coiled flat tube defining an inlet passage having one end connected to the inlet header and the other end connected to the inlet plenum defining a first heat exchange region, exterior walls of said flat tube being spaced apart to provide an intermediate, coaxial, spiral exhaust passage sealed on upper and lower boundaries by gasket means defining a second heat exchange region; and
c) means for controlling over temperature comprising:
  i) bypass means for relief of excess pressure and temperature;
  ii) sensing means for sensing the temperature in the catalyst chamber and for actuating the by pass means; and
wherein exhaust flow passing through the second heat exchange region provides heat for heating inlet flow passing through the first heat exchange region for increased efficiency of operation. L

* * * * *